United States Patent
Nelson et al.

(10) Patent No.: US 6,924,749 B2
(45) Date of Patent: Aug. 2, 2005

(54) METHOD AND APPARATUS FOR FACILITATING CUSTOMER SERVICE FOR A PARKING FACILITY

(75) Inventors: David Nelson, Chicago, IL (US); Walt Tracy, Naperville, IL (US)

(73) Assignee: General Electric Capital Corporation, Stamford, CT (US)

(*) Notice: Subject to any disclaimer, the term of this patent is extended or adjusted under 35 U.S.C. 154(b) by 7 days.

(21) Appl. No.: 10/423,469

(22) Filed: Apr. 25, 2003

(65) Prior Publication Data

US 2004/0213399 A1 Oct. 28, 2004

(51) Int. Cl.⁷ .................................................. B60Q 1/48
(52) U.S. Cl. ......................... 340/932.2; 705/9; 705/13; 379/265.05
(58) Field of Search ......................... 340/932.2; 705/9, 705/13; 379/265.01, 265.05

(56) References Cited

U.S. PATENT DOCUMENTS

| | | | |
|---|---|---|---|
| 4,338,587 A | 7/1982 | Chiappetti | |
| 4,603,390 A | 7/1986 | Mehdipour et al. | |
| 5,072,380 A | 12/1991 | Randelman et al. | |
| 5,206,643 A | 4/1993 | Eckelt | |
| 5,311,186 A | 5/1994 | Utsu et al. | |
| 5,414,624 A | 5/1995 | Anthonyson | |
| 5,432,508 A | 7/1995 | Jackson | |
| 5,737,710 A | 4/1998 | Anthonyson | |
| 5,745,052 A | 4/1998 | Matsuyama et al. | |
| 5,751,973 A | 5/1998 | Hassett | |
| 5,940,481 A | 8/1999 | Zeitman | |
| 6,147,624 A | 11/2000 | Clapper | |
| 6,340,935 B1 | 1/2002 | Hall | |
| 6,373,401 B2 | 4/2002 | Ho | |
| RE37,822 E | 8/2002 | Anthonyson | |
| 6,559,776 B2 * | 5/2003 | Katz ........................ | 340/932.2 |
| 2003/0004792 A1 * | 1/2003 | Townzen et al. .............. | 705/13 |
| 2004/0068433 A1 * | 4/2004 | Chatterjee et al. ............ | 705/13 |

* cited by examiner

Primary Examiner—Jennifer Stone
(74) Attorney, Agent, or Firm—Buckley, Maschoff & Talwalkar LLC

(57) ABSTRACT

A system, method, apparatus, means, and computer program code for facilitating customer service for a parking facility. A parking facility may include one or more garage stations, such as an entry system, exit system, pay station, camera, telephone or other communication device, etc. The garage stations may be in communication directly or indirectly with a call center to report alerts, indicate malfunctions or other problems, or provide other messages. In addition, a customer at the parking facility may use a telephone or other communication device to initiate communication with the call center in order to ask a question, report a problem, etc. The call center may route information regarding an event at a parking facility to an agent station associated with an agent assigned or otherwise selected to respond to the event.

21 Claims, 9 Drawing Sheets

| EVENT 500 ||||||
|---|---|---|---|---|
| EVENT IDENTIFIER 502 | EVENT DATE 504 | EVENT TIME 506 | EVENT LOCATION IDENTIFIER 508 | GARAGE STATION IDENTIFIER 510 |
| V-16453 | 11/01/2002 | 4:45:34 AM | L-401 | GS-401-02 |
| V-31247 | 11/01/2002 | 8:50:21 AM | L-234 | GS-234-08 |
| V-69311 | 11/01/2002 | 12:14:02 PM | L-137 | GS-137-04 |
| V-70485 | 11/02/2002 | 2:38:34 PM | L-014 | GS-014-12 |
| V-93402 | 11/01/2002 | 3:20:02 PM | L-401 | GS-401-05 |

| EVENT 500 |||
|---|---|---|
| AGENT IDENTIFIER 512 | PROBLEM IDENTIFIER 514 | RESOLUTION IDENTIFIER 516 |
| AS-4817 | P-101 | R-16 |
| AS-3210 | P-145 | R-45 |
| AS-3819 | P-135 | R-21 |
| AS-1281 | P-123 | R-08 |
| AS-5106 | P-101 | R-16 |

METHOD AND APPARATUS FOR FACILITATING CUSTOMER SERVICE FOR A PARKING FACILITY

CROSS REFERENCE TO RELATED APPLICATION

This application is related to U.S. application Ser. No. 10/423,841, filed Apr. 25, 2003, entitled "Method and Apparatus for Obtaining Data Regarding a Parking Location", and is also related to U.S. application Ser. No. 10/423,854, filed Apr. 25, 2003, entitled "Method and Apparatus for Integrating Data Regarding Vehicle Events", the contents of both of which are incorporated herein by reference for all purposes.

FIELD OF THE INVENTION

The present invention relates to a method and apparatus for facilitating customer service for a parking facility and, more particularly, embodiments of the present invention relate to methods, means, apparatus, and computer program code for facilitating remote customer service for a parking facility.

BACKGROUND OF THE INVENTION

Parking garages and other parking facilities often include many types of equipment and devices such as entry systems, exit systems, pay stations, security equipment, etc. In addition, parking facilities usually require that a cashier or other attendant be present at the parking facility to interact with parkers. For example, the cashier may interact with monthly and transient parkers, receive payments, and provide customer service and assistance. However, such cashiers and other attendants create a substantial cost for the parking facilities and may not have the experience or ability to handle some customer service requests.

It would be advantageous to provide a method and apparatus that overcame the drawbacks of the prior art and provided a way to reduce, or even eliminate, the need for cashiers or other attendants at a parking facility while facilitating remote customer service and support.

SUMMARY OF THE INVENTION

Embodiments of the present invention provide a system, method, apparatus, means, and computer program code for facilitating customer service for a parking facility. According to embodiments of the present invention, a parking facility may include one or more garage stations, such as an entry system, exit system, pay station, camera, telephone or other communication device, etc. The garage stations may be in communication directly or indirectly with a call center to report alerts, indicate malfunctions or other problems, or provide other messages. In addition, a customer at the parking facility may use a telephone or other communication device to initiate communication with the call center in order to ask a question, report a problem, etc. The call center may route information regarding an event at a parking facility to an agent station associated with an agent assigned or otherwise selected to respond to the event.

Additional objects, advantages, and novel features of the invention shall be set forth in part in the description that follows, and in part will become apparent to those skilled in the art upon examination of the following or may be learned by the practice of the invention.

According to some embodiments of the present invention, a method for facilitating customer service for a parking facility may include receiving data indicative of an event at a parking facility; assigning the event to an agent; and providing data indicative of the event to a device associated with the agent. In some other embodiments, a method for facilitating customer service for a parking facility may include receiving data indicative of an event at a parking facility; determining the parking facility; determining an agent to handle the event; and providing data indicative of the event to a device associated with the agent. In some further embodiments, a method for facilitating customer service for a parking facility may include receiving data indicative of an event at a parking facility; determining a garage station associated with the event; requesting permission to control a garage station at the parking facility; receiving authorization to control the garage station at the parking facility; and providing data to the garage station. In some embodiments of the present invention, each of the methods disclosed herein may be implemented by a system, apparatus, computer code or other means.

According to some embodiments of the present invention, A system for facilitating customer service for a parking facility may include at least one agent station; and a call center device in communication with at least one garage station at a parking facility and the at least one agent station, the call center device adapted to receive data indicative of an event at the parking facility, to assign the event to an agent, and to provide data indicative of the event to an agent station associated with the agent.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 9 is an illustration of a representative entity information database of FIG. 8.

DETAILED DESCRIPTION

Applicants have recognized that there is a market opportunity for systems, means and methods that facilitate customer service for one or more parking facilities. In addition, applicants have recognized that there is a market opportunity for systems, means, and methods that allow customer service to be provided remotely to one or more parking facilities. According to embodiments of the present invention, a parking facility may include one or more garage stations, such as an entry system, exit system, pay station, camera, telephone or other communication device, etc. The garage stations may be in communication directly or indirectly with a call center to report alerts, indicate equipment malfunctions or other problems, or provide other messages. In addition, a customer at the parking facility may use a telephone or other communication device to initiate communication with the call center in order to ask a question, report a problem, etc. The call center may route information regarding an event at a parking facility to an agent station associated with an agent assigned or otherwise selected to respond to the event. These and other features will be discussed in further detail below, by describing a system, individual devices, and processes according to embodiments of the invention.

Parking Facility

Figure 1:
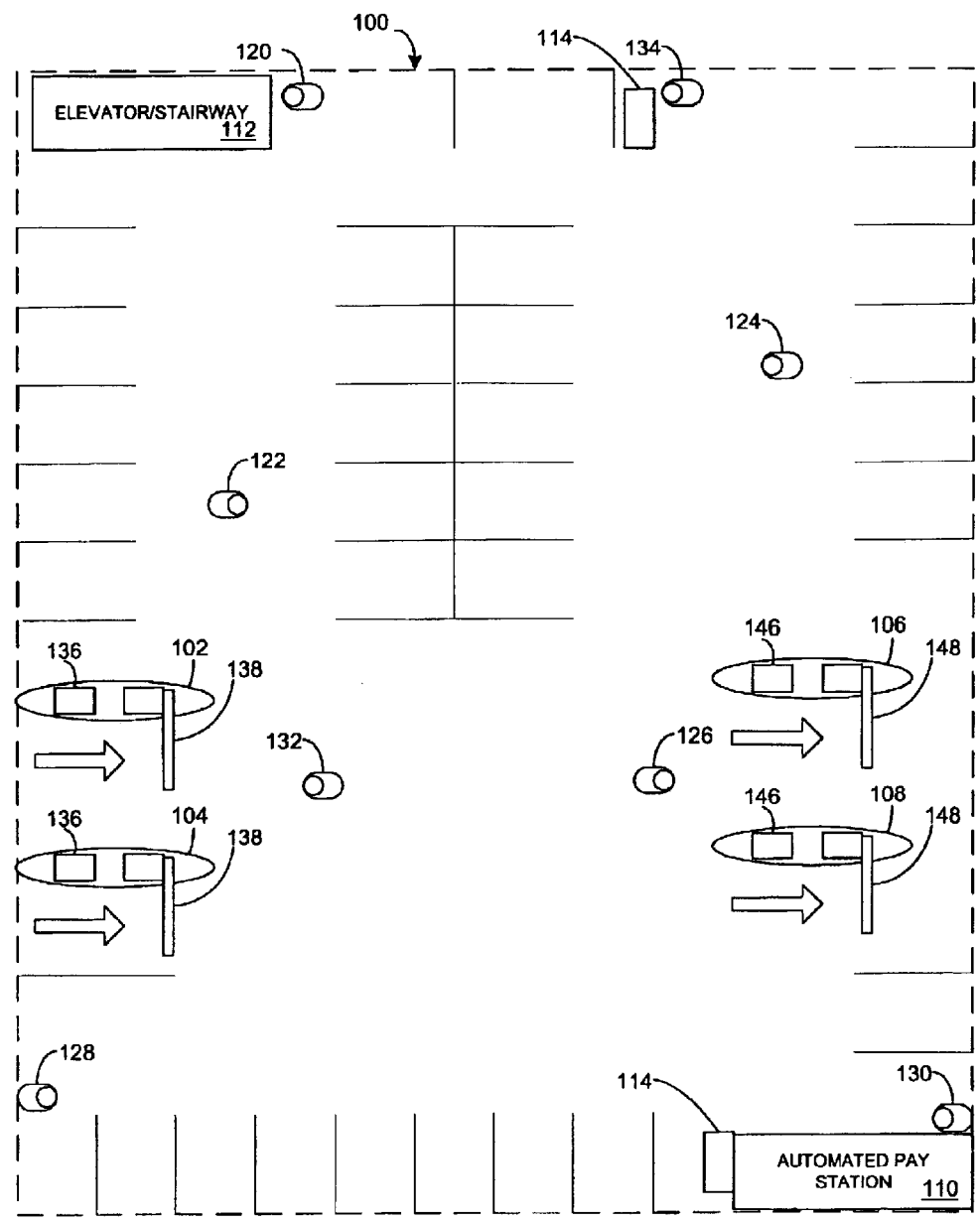
FIG. 1 is an illustration of a representative parking facility.

Now referring to FIG. 1, a representative parking facility 100 is illustrated. The parking facility may include entry systems 102, 104 that provide entry into the parking facility 100, exit systems 106, 108 that provide exit from the parking facility 100, one or more automated pay stations 110 that allows a customer to pay after parking in the parking facility 100, one or more elevators/stairways 112 that allow pedestrians to enter and leave the parking facility 100 or change levels within the parking facility 100, and one or more telephone, intercoms, call buttons, or other communication devices 114 that allow people within the parking facility to make calls or otherwise communicate with a call center.

In addition, the parking facility 100 may include cameras or video devices 120, 122, 124, 126, 128, 130, 132, 134 that allow a video or other image signals to be sent to the call center and allow personnel or devices at the call center to monitor activities in the parking facilities. In some embodiments, an entry system and/or an exit system also may include a telephone, intercom, call button, or other communication device that may allow a person in a vehicle to contact a call center while at the entry system or exit system, as will be discussed in more detail below.

The entry systems 102, 104 may be observed or monitored by the camera or image capture device 132. Each of the entry systems 102, 104 may include a ticket dispenser or card reader 136 and a gate 138. In some embodiments, when a daily or other short term parker (also referred to as a transient parker) enters an entry system, the parker may receive a ticket from the ticket dispenser or card reader 136 that is stamped with the time and date of the entry. The ticket dispenser or card reader 136 may allow a person to pay for entry into the parking facility with cash or a credit card. Alternatively, a person may be able to swipe a card or other device in front of the ticket dispenser or card reader 136 to gain entry into the parking facility 100 without making a payment (e.g., a person having a monthly parking pass). Upon dispensing of a ticket and/or receiving a payment, the gate 138 in the entry system may rise to allow the parker to drive a vehicle into the parking facility. The ticket may include a ticket number, a time/date stamp, or other information. In some embodiments, an entry system may receive information from another device regarding which ticket number, time/date, etc. to print on the ticket.

In some embodiments, an entry system may create and send an event message when, for example, the ticket dispenser 136 is low on tickets or ink, a ticket is jammed in the ticket dispenser 136 or the ticket dispenser 136 has otherwise malfunctioned, a credit card or other object is jammed in the ticket dispenser 136, an invalid card has been provided to pay for parking or to otherwise gain entry into the parking facility 100, the gate 138 fails to open or close, a person has presented an invalid or expired pass, a call button or other communication device at the entry system has been activated, etc.

The automated pay station 110 may allow a person to pay for parking after the person has parked a vehicle in the garage and did not pay at the entry system 102 or 104. For example, a person entering the parking facility 100 may receive a ticket from the ticket dispenser 136 in the entry system 102 when driving a vehicle into the parking facility. When the person is ready to leave, the person may insert the ticket into the automated pay station 110, which then computes the amount due. The person can then insert cash or a credit card into the automated pay station to make the payment. Upon making the payment, the automated pay station may provide a receipt or ticket that the person can then insert into the exit system 106 or the exit system 108 to exit the parking facility. If the person waits too long to insert the ticket provided by the automated pay system into an exit system, the ticket may be rendered invalid or the person may have to pay an additional fee.

The automated pay station 110 may be observed or monitored by the camera or image capture device 130. In some embodiments, the automated pay system 110 may create and send an event message when, for example, a ticket acceptor in the automated pay station 110 is full, a ticket, card, or other object is jammed in the automated pay station 110, the automated pay station 110 has malfunctioned, an invalid card or ticket has been provided to the automated pay station 110, the automated pay station is low on money to provide change, the automated pay station is low on paper in which to print receipts, a call button or other communication device at the automated pay station 110 has been activated, etc.

The exit systems 106, 108 may be observed or monitored by the camera or image capture device 126. Each of the exit systems 106, 108 may include a ticket acceptor or card reader 146 and a gate 148. In some embodiments, an exit system may receive a ticket from a parker (e.g., the ticket provided by the automated pay station 10), verify that the parker has paid or allow the parker to make a payment via cash, credit card, or other means, provide a receipt to the parker, etc. An exit system also may allow a person swipe a card in the card reader 146 to make a payment via credit card or to gain exit from the parking facility without making payment (e.g., a person having a monthly parking pass).

In some embodiments, an exit system may create and send an event message when, for example, the ticket acceptor 146 is full, a ticket is jammed in the ticket acceptor 146 or the ticket acceptor 146 has otherwise malfunctioned, a credit card or other object is jammed in the ticket accepter 146, an invalid card or ticket has been provided to the ticket acceptor 146, the gate 148 fails to open or close, a person has presented an invalid or expired pass, a call button or other communication device at the exit system has been activated, etc.

As will be discussed in more detail below, some or all of the entry systems 102, 104, exit systems 106, 108, automated payment system 110, communication devices 114, and cameras or image capture devices 120, 122, 124, 126, 128, 130, 132 may be considered garage stations and may be directly or indirectly in communication with a call center for purposes of providing customer service and other functions for the parking facility 100. In some embodiments, a parking facility may include other devices, such as fire alarms, smoke detectors, panic buttons, etc., that may or may not be in communication with a call center for purposes of providing alerts or other messages to the call center.

System

Figure 2:
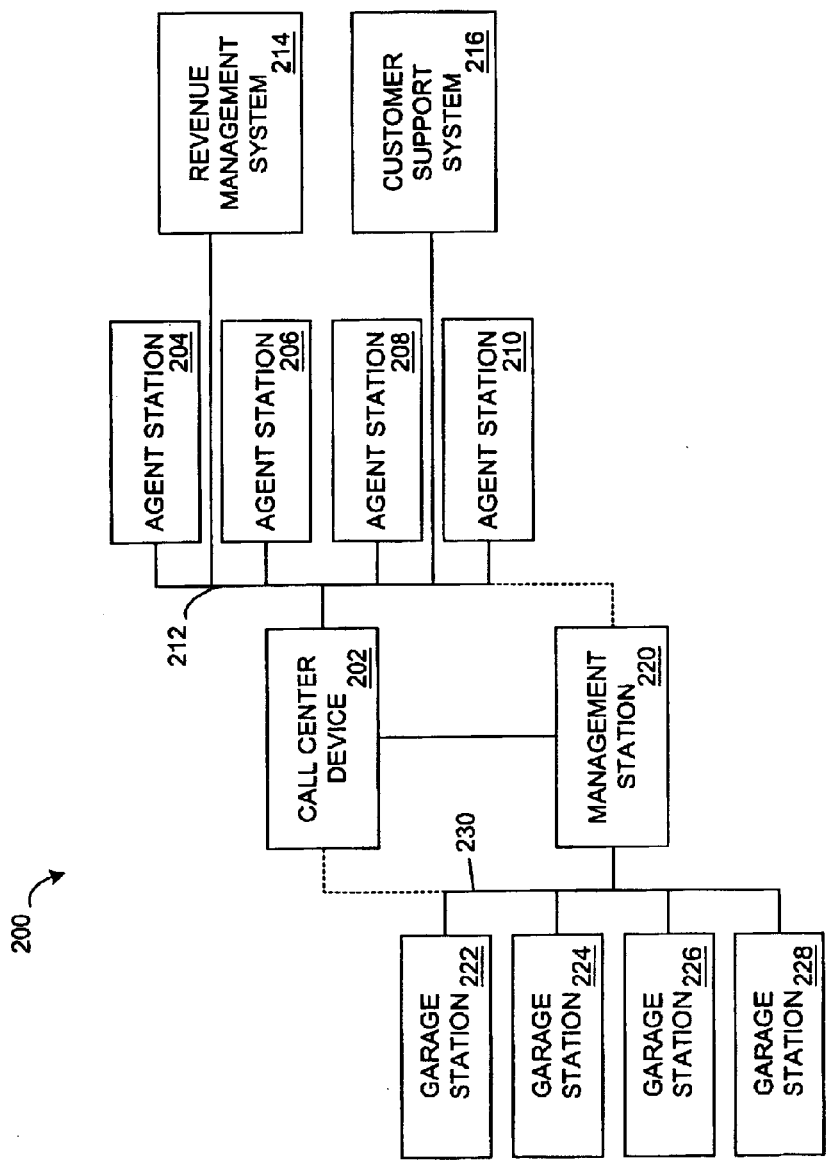
FIG. 2 is a block diagram of system components for an embodiment of an apparatus in accordance with the present invention.

Now referring to FIG. 2, an apparatus or system 200 usable with the methods disclosed herein is illustrated. The system 200 includes a call center device 202 in communication directly or indirectly with one or more agent stations 204, 206, 208, 210 via a communication channel or network 212. In some embodiments, the call center device 202 and one or more of the agent stations 204, 206, 208, 210 may be located in the same general location. In other embodiments, different agent stations may be located in different geographic locations.

Each of the agent stations 204, 206, 208, 210 and the call center device 202 also may be in communication directly or indirectly with a revenue management system or application 214 and/or a customer support system or application 216 via the communication channel or network 212. The call center device 202 also may be in communication with a management station 220, that itself may be in communication directly or indirectly with one or more garage stations 222, 224, 226, 228 via a communication channel or network 230. The management station 220 and the garage stations 222, 224, 226, 228 may be located in or near the same parking facility, such as the parking facility 100.

In some embodiments, the call center 202 may be able to communicate directly with one or more of the garage stations 222, 224, 226, 228, as indicated by the dashed portion of the network 230. Similarly, in some embodiments, the management system 220 may be able to communicate directly with one or more of the agent stations 204, 206, 208, 210, the revenue management system 214, and/or the customer support system 216, as indicated by the dashed portion of the network 212.

When a problem or other event occurs at the parking facility 100, a garage station may initiate and send a message to the management station 220, which in turn may initiate and send a message to the call center device 202. The call center device 202 may then send information regarding the event to one of the agent stations 204, 206, 208, 210 for processing or handling by an agent. The agent may communicate with a person in the parking facility 100 via an agent station and a communications device 114 located at the parking facility, access one of the cameras 120, 122, 124, 126, 128, 130, 132 in the parking facility 100 to get a better view of a problem, equipment malfunction, etc.

In some embodiments, two or more devices/applications illustrated in the system 200 may communicate via a communications network. For example, the communication channels 212, 230 may include one or more communication networks. In some embodiments, a communications network might be or include the Internet, the World Wide Web, or some other public or private computer, cable, telephone, client/server, peer-to-peer, or communications network or intranet, as will be described in further detail below. A communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

The devices/applications shown in FIG. 2 need not be in constant communication. For example, the management station 220 device may communicate with the call center device 202 only when such communication is appropriate or necessary.

Many different types of implementations or hardware configurations can be used in the system 200 and with the methods disclosed herein and the methods disclosed herein are not limited to any specific hardware configuration for the system 200 or any of its components.

As previously discussed above, in some embodiments a garage station may be, be part of, or include some of the devices found at a parking facility, such as an automated pay station, a telephone, intercom or other communication device, an entry system, an exit system, a camera or image capture device, etc. A garage station may send an alert or other message to the management station 220. For example, as previously discussed above, the entry system 102 may create and send an event message to the management station 220 when, for example, the ticket dispenser 136 is low on tickets or ink, a ticket is jammed in the ticket dispenser 136 or the ticket dispenser 136 has otherwise malfunctioned, the gate 138 fails to open or close, a call button or other communication device at the entry system 102 has been activated, etc. As another example, the telephone or other communication device 114 may send an event message to the management station 220 when the telephone or other communication device 114 is activated or used by a person at the parking facility 100. The management station 202 may send a message to the call center device 202 inform the call center device 202 of the event.

The revenue management system 214 may include one or more devices or applications that monitor or help control entry into and exit from the parking facility 100, payment computations, or other functions. For example, the revenue management system 214 may keep and maintain a list of monthly parking passes and their expiration dates, information regarding tickets dispensed by an entry system (e.g., the date/time the ticket was dispensed, a number printed on the ticket), information regarding historical use and use patterns of the parking facility, etc.

In some embodiments, the revenue management system 214 may keep information regarding license plate numbers for vehicles parked in the parking facility 100 for more than one day. When parking in a parking facility for more than one day, a customer may claim that they have lost their ticket, since the cost of a lost ticket may be less than the cost of parking in the facility for more than one day. In order to counter this, someone may go through the garage each night and record the license plate numbers of all cars parked in the parking facility 100. The person may then provide the license plate numbers to the management station 220 or the revenue management system 214. If a customer claims a lost ticket and contracts the call center device, a check may be made against the stored list of license plate numbers to determine if the customer has been parked in the parking facility for more than one day. One of the cameras or image capture devices 120, 122, 124, 126, 128, 130, 132 may be used to ascertain the license plate number of the vehicle associated with the customer and/or the customer may be requested to provide the license plate number information.

The customer support system 216 may include one or more devices and/or applications that assist a call agent or the call center device 202 in responding to messages or customer service requests, as will be discussed in more detail below.

In some embodiments, one or more of the cameras or image capture devices 120, 122, 124, 126, 128, 130, 132 located at the parking facility 100 may provide video or image feeds to the management station 220 on a continuous, periodic, as needed, or as requested basis. In addition, the management station 220 may be able to control or move some or all of the cameras or image capture devices 120, 122, 124, 126, 128, 130, 132.

In some embodiments, one or more of the communication devices 114 or other communication devices located in or at an entry system or exit system may route communications through the management station 220 or may be accessible via the management station 220. For example, a telephone may operate as an IP (internet protocol) telephone or send voice messages to the management station 220 in a voice-over-packet compliant protocol.

In some embodiments, an entry system may print or include a ticket number, a time/date stamp, or other information on a ticket it dispenses a person driving a vehicle into the garage. In some embodiments, an entry system may receive information from the management station 220 regarding which ticket number, time/date, etc. to print on the ticket. For example, a person driving a vehicle through the entry system 102 may press a button on the ticket dispenser 136 to receive a ticket. The entry system 102 may send a message to the management station 220 requesting a ticket number and a date/time to print on the ticket. The management station 220 may provide the necessary information to the entry system 102, which can then print it or include it on a ticket dispensed to the person. Once the person has taken the ticket, the entry system 102 may cause the gate 138 to open to allow the person to drive the vehicle into the parking facility. Alternatively, the entry system 102 may send a message to the management system 220 that the ticket has been taken. The management system 220 may then send a message to the entry system 102 instructing the entry system 102 to open the gate 138. The management system 220 may store the ticket information and/or may provide it to a back end system (e.g., the revenue management system) for storage.

In some embodiments, a garage station may accept or scan a card or other object to allow entry into a parking facility and/or exit from a parking facility. For example, the entry system 104 (e.g., a garage station) may include a call reader 136 that enables a person having a monthly pass to gain entry into the parking facility. The entry system 104 itself may have the information needed to verify the non-expiration or validity of the monthly pass. For example, the entry system 104 may receive the information from the management station 220. The management station 220 may provide updated information to the entry system 104 periodically or on an as needed basis. Alternatively, the management station 220 may store the information and the entry system 104 may send a message or query to the management station 220 to determine if the monthly pass is valid. The management station 220 may receive updated information regarding the monthly passes directly or indirectly from a back end system or application, such as the customer support system 216 or the revenue management system 214. If a monthly pass presented to gain entrance to or exit from the parking facility 100 is valid, the entry system 104 may create or receive a message indicating that it should open the gate 138. If the monthly pass is expired or otherwise invalid, the entry system 104, the management station 220, or the backend system (e.g., the customer support system 216 or the revenue management system 214) may originate a message to the call center device 202 alerting it to the problem. In addition, the entry system 104 may provide a notification (e.g., light, sound, audio message) that the monthly pass is invalid.

In some embodiments, a garage station (e.g., the automated pay station 110) may accept or scan a credit card, debit card, etc. from a person to pay for parking at the parking facility. The automated pay station 110 may initiate a check to determine if the card is valid. Alternatively, the automated pay station 110 may send a message to the management station 220 which may initiate a check to determine if the card is valid or send a message to a back end system which may initiate a check to determine if the card is valid. If the card is valid, the automated pay station 110 may receive a message initiated by the management station 220 of the back end system instructing the automated pay station 110 to print a receipt for the person. The management system 220 or the back end system also may charge the card for the payment. If the card is invalid, the automated pay station 110 may receive a message initiated by the management station 220 of the back end system instructing the automated pay station 110 to display or provide a message requesting that the person provide another form of payment and/or that the card cannot be used to make the payment. In addition, the management system 220 or the back end system may initiate or send a message to the call center device 202 alerting it of the problem.

In some embodiments, an exit system may accept a ticket to allow a person to exit the parking facility 100. For example, a person exiting the parking facility 100 may pay for parking at the automated pay station 110 (e.g., a garage station). The person may insert a ticket (e.g., a ticket obtained from an entry system) into the automated pay station 110. The automated pay station 110 may determine the payment due and provide or display the payment due information to the person. Alternatively, the automated pay station 110 may send a message to the management station 220 requesting that it provide information regarding the payment due. The management station 220 itself may compute the amount due and provide the information to the automated pay station 110. Alternatively, the management station 110 may send a request to a back end system (e.g., the revenue management system 214) to compute the payment due and upon receiving the payment due information from the back end system, provide the information to the automated pay station 110. Upon proper payment, the person may receive a ticket from the automated pay station 110 that the person can provide to or insert the exit system 106 to exit the parking facility 110.

Upon receiving the ticket, the exit system 106 may determine if the ticket is valid (e.g., is the ticket a proper ticket number for exit, is the ticket too old to be used to gain exit from the parking facility). Alternatively, the exit system 106 may send a message to the management station 220 that may determine if the ticket is valid. Alternatively, the management station 220 may send a message to a back end system to determine if the ticket is valid. If the ticket is valid, the management station 220 or the back end system may send a message to the exit system 106 instructing the exit system 106 to open the gate 148. If the ticket is invalid, the management station 220 or the back end system may instruct the exit system 106 to display a message indicating that the ticket is invalid. The management station 220 or the back end system also may send a message to the call center device 202 to alert it of the problem.

In some embodiments, an exit system may accept or scan a credit card, debit card, etc. from a person to pay for parking at the parking facility. The exit system may initiate a check to determine if the card is valid. Alternatively, the exit system may send a message to the management station 220 which may initiate a check to determine if the card is valid or send a message to a back end system which may initiate a check to determine if the card is valid. If the card is valid, the exit system may receive a message initiated by the management station 220 of the back end system instructing the exit system to print a receipt for the person and/or to raise the gate 148. The management system 220 or the back end system also may charge the card for the payment. If the card is invalid, the exit system may receive a message initiated by the management station 220 of the back end system instructing the automated pay station 110 to display or provide a message requesting that the person provide another form of payment and/or that the card cannot be used to make the payment. In addition, the management system 220 or the back end system may initiate or send a message to the call center device 202 alerting it of the problem.

In some embodiments, certain events occurring at the parking facility 100 may trigger specific actions. For example, if an alarm goes off, an elevator malfunctions, a fire alarm or other emergency button is pushed or activated, etc., the call center device 202 or the management station 220 may place a call automatically to 911 or to another designated telephone number or party.

Process Description

Figure 3:
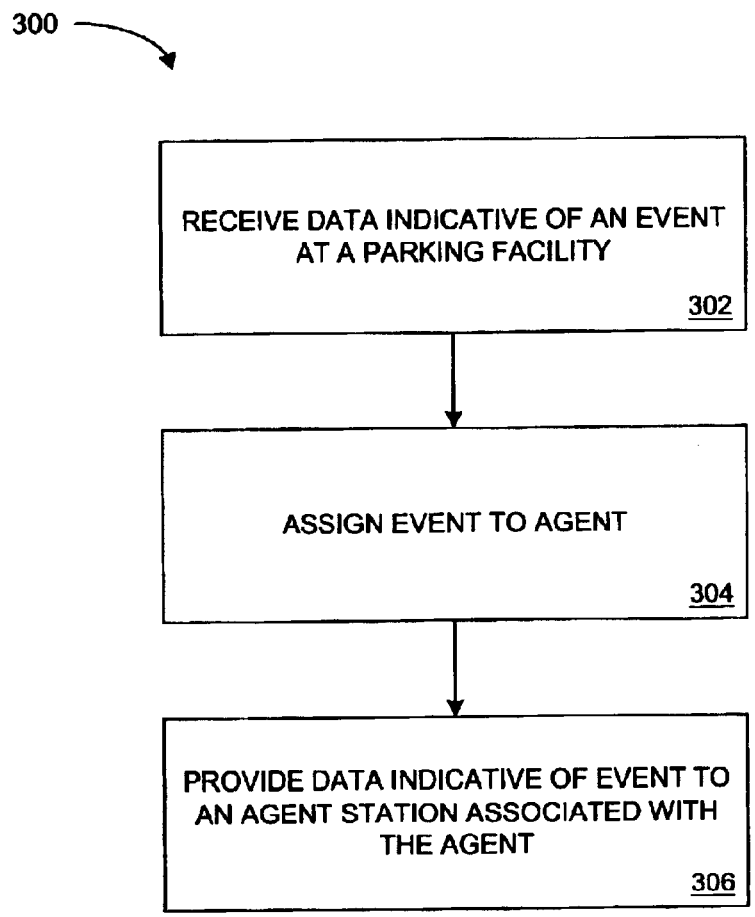
FIG. 3 is a flowchart of a first embodiment of a method in accordance with the present invention.

Reference is now made to FIG. 3, where a flow chart 300 is shown which represents the operation of a first embodiment of the present invention. The particular arrangement of elements in the flow chart 300 is not meant to imply a fixed order to the steps; embodiments of the present invention can be practiced in any order that is practicable. In some embodiments, some or all of the steps of the method 300 may be performed or completed by the call center device 202.

Processing begins at a step 302 during which the call center device 202 receives a message or other data indicative of an event at the parking facility 100. For example, as previously discussed above, the entry system 102 may create and send an event message to the call center device 220 directly or via the management station 220 when, for example, the ticket dispenser 136 is low on tickets or ink, a ticket is jammed in the ticket dispenser 136 or the ticket dispenser 136 has otherwise malfunctioned, the gate 138 fails to open or close, a call button or other communication device at the entry system 102 has been activated, etc. As another example, the telephone or other communication device 114 may send an event message directly to the call center device 202 or via the management station 220 when the telephone or other communication device 114 is activated or used by a person at the parking facility 100. For example, the person may have lost a ticket, may not understand instructions paying using the automated pay station 110, may not receive a ticket from an entry system, may not receive a receipt from the automated pay station 110, may have a jammed ticket, may have a credit card or monthly pass that is rejected or not working, may want to report an equipment failure (e.g., a gate at an entry system not working), etc. and may want to communicate with an agent. In another example, the revenue management system 214 may send an event message when a person has presented an invalid ticket, credit card, monthly pass, etc. to pay for parking at the parking facility 100 or to exit the parking facility.

In some embodiments, the event message received during the step 302 may be initiated by a garage station and may include information regarding the event, such as an indicator or identifier of the garage station initiating the event message or related to the event, an indicator or identifier of the parking facility that includes the garage station, an indicator or identifier of the type of problem, etc. Types of problems include, for example, a gate at an exit system not opening or closing, a gate at an entry system not opening or closing, a garage station being out of order or not responding to signals from the management station 220, a pay station is out of change, an alarm in the parking facility has gone off, etc.

In some embodiments, the event message received during the step 302 may be initiated by the management station 220 or a back end system such as the revenue management system 214. For example, the revenue management system 220 may initiate an event message when an invalid monthly pass is presented at the entry system 102 for entry into the parking facility 100, an invalid credit card is presented to the automated payment system 110 to make payment for parking, an invalid ticket is inserted into the exit system 106 to gain exit from the parking facility, a customer has claimed a lost ticket and there is evidence that the customer has parked in a parking facility for longer than one day, a monthly parking pass is used twice in a row at an entry system without being used at an exit system in between, a monthly parking pass is used twice in a row at an exit system without being used at an entry system in between, etc.

In some embodiments, the call center device 202 may need to determine where the parking facility and/or the garage station that is sending the data. For example, a communication device 114 at the parking facility may initiate a telephone call to the call center device 202 when activated or used by a person at the parking facility 100. The call center device 202 may have access to or use a caller identification capability or an automatic number identifier (ANI) capability to determine from data on the incoming call the telephone number of the communication device 114 initiating the call. The call center device 202 may have or have access to a database that can relate the telephone number to the parking facility 100 and/or to the communication device 114. Alternatively, the call center device 202 may send the telephone number to another device or application (e.g., the customer support system 216) that may identify the parking facility 100 and/or the communication device 114 and provide location information or identifiers back to the call center device 202.

During a step 304, the call center device 202 assigns the event to an agent that can respond to, process, or handle the event. For example, the call center device 202 may select from among one or more available agents to assign the event. As another example, the call center device 202 may assign the event to an agent that has handled similar problems in the past, has handled problems associated with the parking facility in the past, has the appropriate seniority to handle the event, is located in a geographic area near the parking facility related to the event, etc. In some embodiments, the call center device 202 may assign different agents depending on the time of day, the shifts of agents, or some other criteria.

During a step 306, the call center device 202 provides data indicative of the event to an agent station associated with the agent selected during the step 304. The agent may then attempt to troubleshoot the problem, communicate with a person at the parking facility, respond to an inquiry, access the revenue management system 214 and/or the customer support system 216 for additional information, etc. In some embodiments, the agent station may include an IP telephone that can communicate with a communications device 114 at the parking facility and/or a computer or other device that can access video or image signals or streams produced by one or more of the cameras or image capture devices 120, 122, 124, 126, 128, 130, 132 at the parking facility 100.

Figure 4:
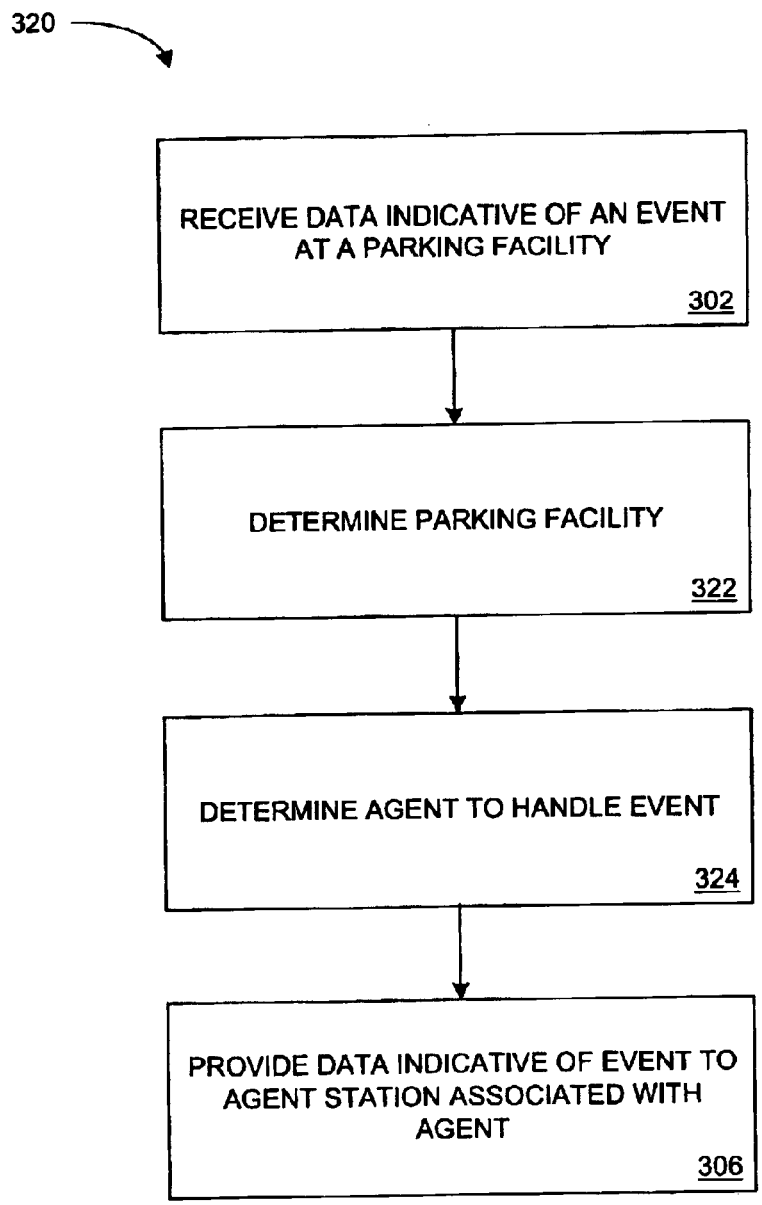
FIG. 4 is a flowchart of a second embodiment of a method in accordance with the present invention.

Reference is now made to FIG. 4, where a flow chart 320 is shown which represents the operation of a second embodiment of the present invention. The particular arrangement of elements in the flow chart 320 is not meant to imply a fixed order to the steps; embodiments of the present invention can be practiced in any order that is practicable. In some embodiments, some or all of the steps of the method 140 may be performed or completed by the call center device 202. The method 320 includes the steps 302 and 306 previously discussed above.

After receiving data indicative of an event at a parking facility during the step 302, processing begins at a step 322 during which the call center device 202 determines the parking facility and/or the garage station associated with the event. As previously discussed above, in some embodiments, the call center device 202 may have access to or use a caller identification capability or an automatic number identifier (ANI) capability to determine from data on the incoming call the telephone number of the communication device 114 initiating the call. The call center device 202 may have or have access to a database that can relate the telephone number to the parking facility 100 and/or to the communication device 114. Alternatively, the call center device 202 may send the telephone number to another device or application (e.g., the customer support system 216) that may identify the parking facility 100 and/or the communication device 114 and provide location information or identifiers back to the call center device 202.

During a step 324, the call center device 202 determines an agent to handle the event. The step 324 is similar to the step 304 previously discussed above. The call center device 202 then sends data indicative of the event to an agent station associated with the agent determined during the step 324.

Figure 5:
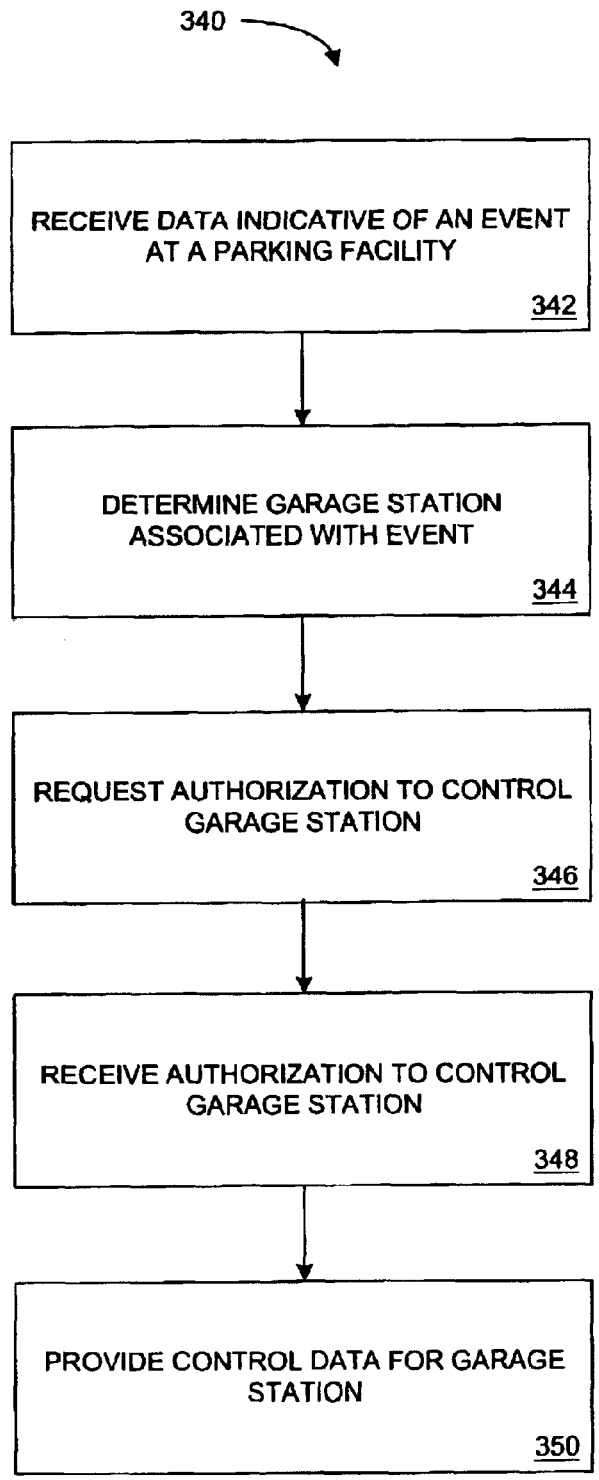
FIG. 5 is a flowchart of a third embodiment of a method in accordance with the present invention.

Reference is now made to FIG. 5, where a flow chart 340 is shown which represents the operation of a third embodiment of the present invention. The particular arrangement of elements in the flow chart 340 is not meant to imply a fixed order to the steps; embodiments of the present invention can be practiced in any order that is practicable. In some embodiments, some or all of the steps of the method 340 may be performed or completed by an agent station, such as the agent station 204.

Processing begins at a step 342 during which the agent station 204 receives data indicative of an event at a parking facility. The data may indicate or identify the parking facility, the type of problem, etc. Some or all of the data may be received directly or indirectly from the call center device 202, a back end system (e.g., the revenue management system 214) and/or the management station 220.

During a step 344, the agent station 204 determines a garage station associated with the event, which may include or be a garage station usable or useful in responding to the event. In some embodiments, the data that the agent station 204 receives during the step 342 may identify the parking facility and/or the garage station. For example, the agent station 204 may receive an identifier of a garage station in the data received during the step 342. The agent station 1204 may then query or access a database that can provide information regarding the garage station (e.g., it's type, location, operational history, vendor name, etc.).

In other embodiments, the agent station 204 may use some or all of the data and access or query a database, application or backend system to determine the garage station. For example, an agent at the agent station 204 may want to identify a camera that can provide a still or moving image of an area of the parking facility to help troubleshoot a problem associated the event. If the entry system 102 is experiencing some sort of malfunction, the agent may want to identify the camera 132 that can provide images of the entry system 102. If a customer at the garage is using a communication device at the pay station 110 to communicate with the agent, the agent may want to identify the camera 130.

During a step 346, the agent station 204 may request authorization to control the garage station identified or otherwise determined during the step 344, which may be or include a request to communicate with the garage station. For example, an agent may want to send a reset signal to the entry system 102, a query for information to the pay station 110, a signal to the exit system 104 to raise the gate 148, a signal to the camera 130 to provide an image, a signal to the camera 132 to rotate, a signal to an alarm to reset or turn off, etc.

In some embodiments, the agent station 204 may send the request to the management station 220, either directly or via the call center device 202. The management station 220 may then provide or deny such authorization in a message sent to the agent station 204, either directly or via the call center device 202, which is received by the agent station 204 during a step 348. In some embodiments, the agent station 204 may request authorization from other devices or applications to control the garage station.

During a step 350, the agent station 204 provides or sends a control signal or other message to the garage station identified during the step 344. The agent station 204 may send the message to the garage station via the management station directly, or via the call center device 202. An agent at the agent station 204 then may continue to troubleshoot or analyze the event.

Agent Station

Figure 6:
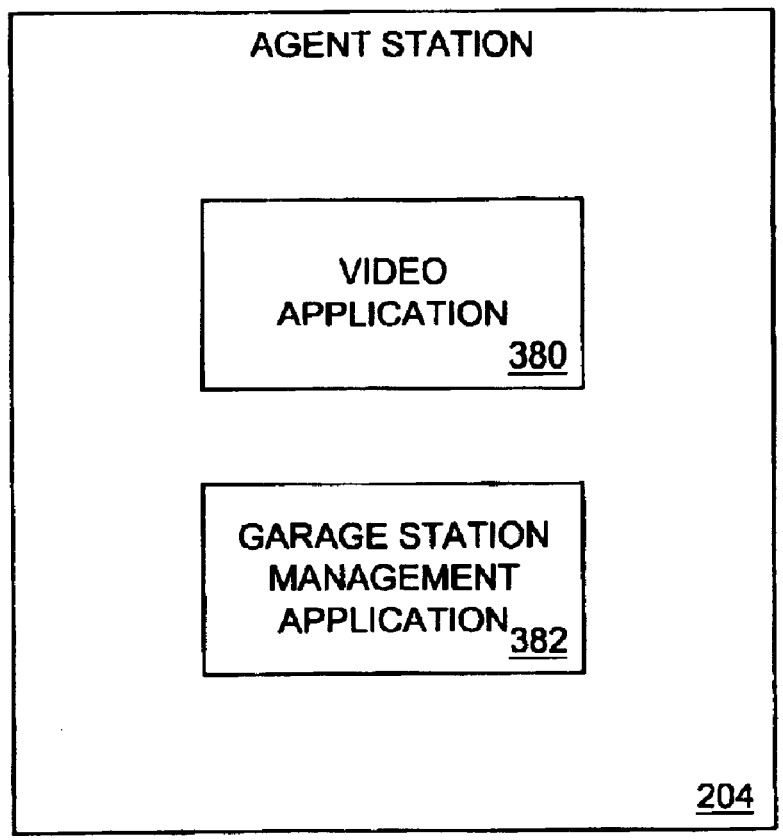
FIG. 6 is a block diagram of an agent station of FIG. 1.

Now referring to FIG. 6, a more detailed block diagram of an agent station (e.g., the agent station 204) is illustrated. An agent station may be or include any of a number of different types of devices, including, but not limited to a personal computer, portable computer, mobile or fixed user station, workstation, network terminal or server, telephone, beeper, kiosk, dumb terminal, personal digital assistant, facsimile machine, two-way pager, radio, cable set-top box, etc. In some embodiments, an agent station may have the same structure or configuration as the call center device 202 and include some or all of the components of the call center device 202, as discussed in more detail below.

In some embodiments, the agent station 204 may include a video application 380 and/or a garage station management application 382. The video application 380 may allow or enable the agent station 204 to receive and/or display images from one or more cameras or image capture devices located at a parking facility. The garage management application 382 may allow or enable the agent station 204 to communicate with the management station 220, the call center device 202, and/or other devices, applications, or systems, send a control signal to a garage station, or perform other functions.

Additional System Embodiment

Figure 7:
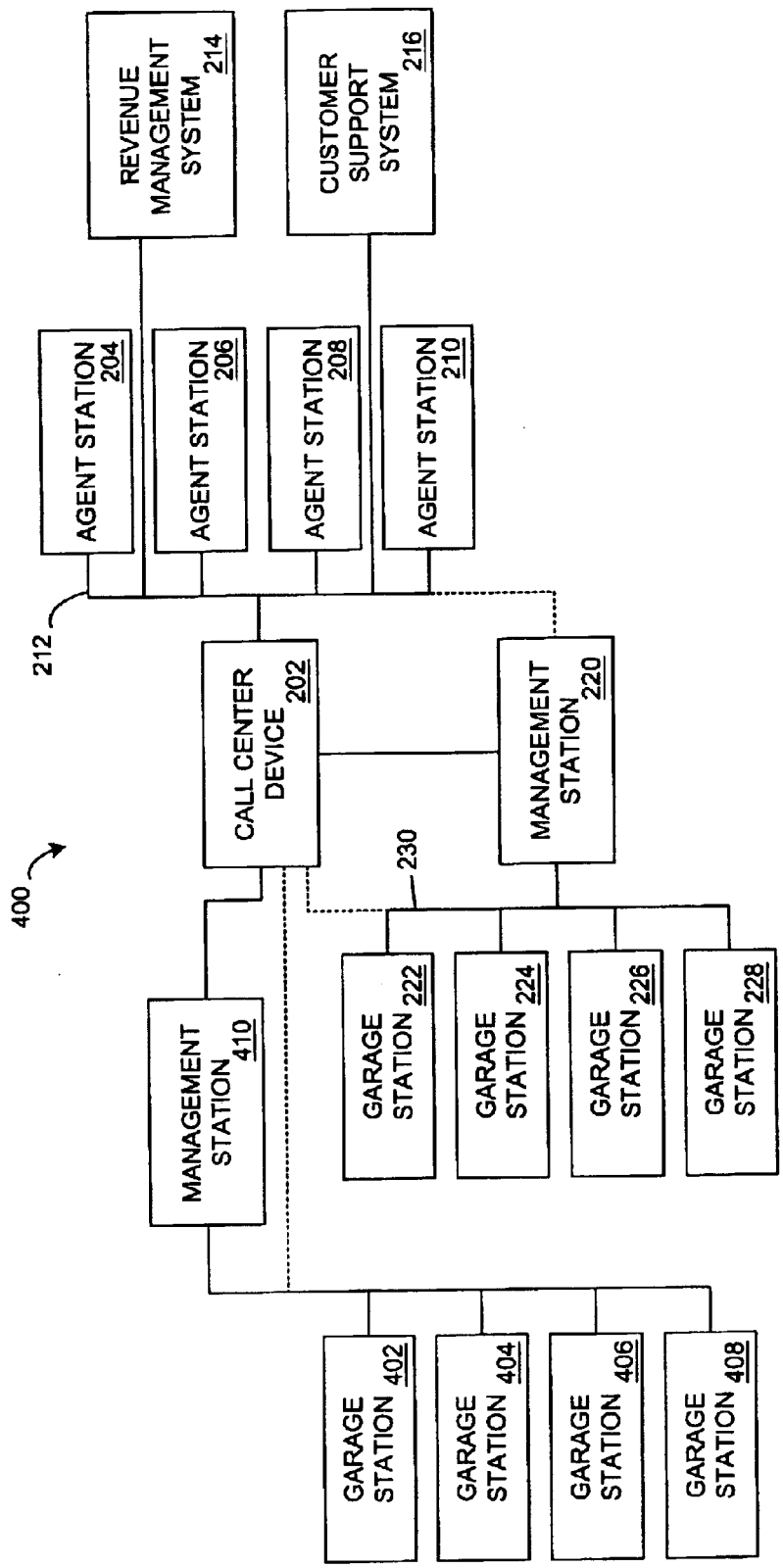
FIG. 7 is another block diagram of system components for an embodiment of an apparatus in accordance with the present invention.

Now referring to FIG. 7, another representative apparatus or system 400 is illustrated that may operate in accordance with the present invention. The system 400 includes all of the components of the system 200 previously discussed above. In addition, the apparatus 400 includes additional garage stations 402, 404, 406, 408 that may be in communication directly with the call center device 202 or with the management station 410. The garage stations 402, 404, 406, 408 and the management station 410 may be located at or associated with a parking facility different from the parking facility 100, but may operate in a manner similar to the garage stations and management station previously discussed above.

Call Center Device

Figure 8:
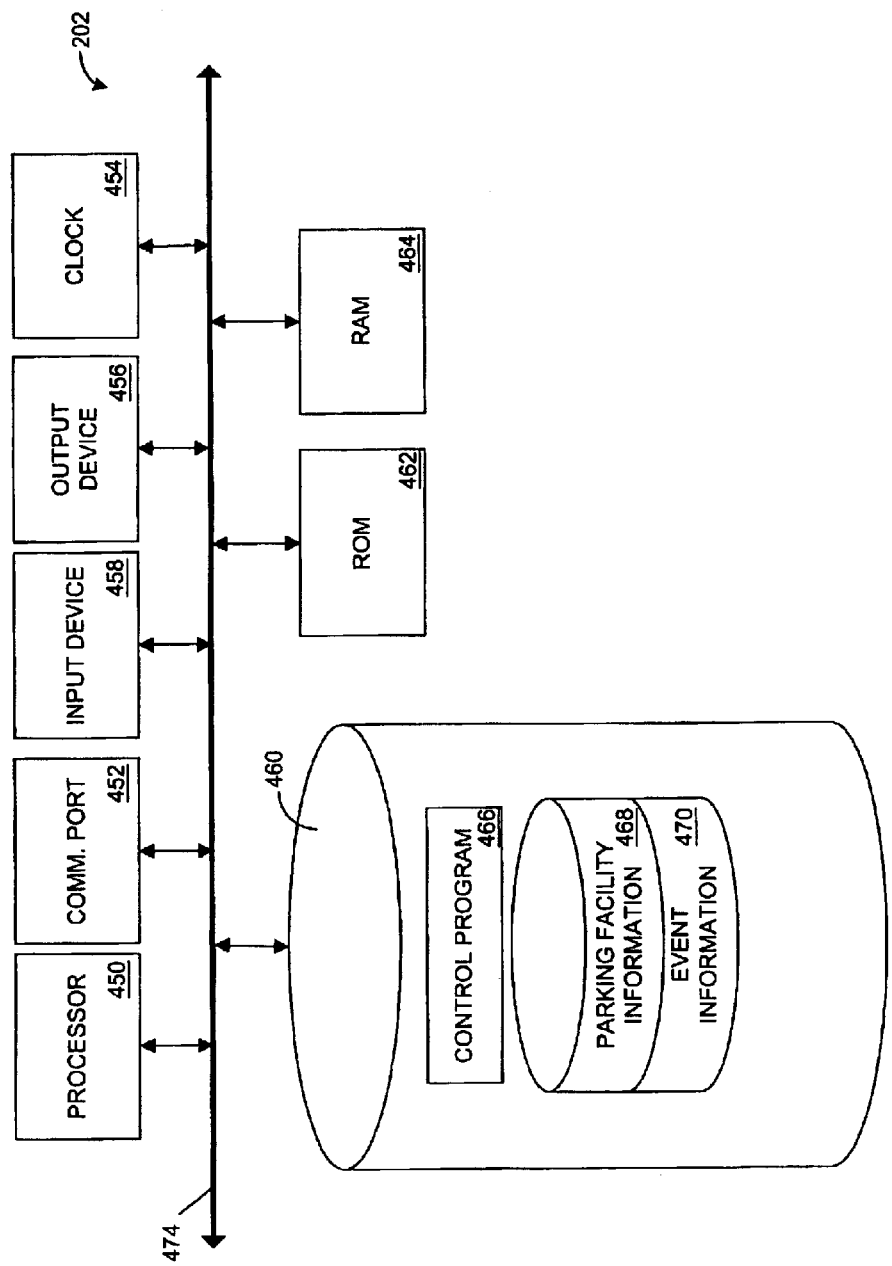
FIG. 8 is a block diagram of components for an embodiment of a call center device of FIG. 1.

Now referring to FIG. 8, a representative block diagram of one embodiment of the call center device 202 is illustrated. The call center device 202 may include a processor, microchip, central processing unit, or computer 450 that is in communication with or otherwise uses or includes one or more communication ports 452 for communicating with user devices and/or other devices. Communication ports may include such things as local area network adapters, wireless communication devices, Bluetooth technology, etc. The call center device 202 also may include an internal clock element 454 to maintain an accurate time and date for the call center device 202, create time stamps for communications received or sent by the call center device 202, etc.

If desired, the call center device 202 may include one or more output devices 456 such as a printer, infrared or other transmitter, antenna, audio speaker, display screen or monitor, text to speech converter, etc., as well as one or more input devices 458 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the call center device 202 may include a memory or data storage device 460 to store information, software, databases, communications, device drivers, etc. The memory or data storage device 460 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The call center device 202 also may include separate ROM 462 and RAM 464.

The processor 450 and the data storage device 460 in the call center device 202 each may be, for example: (i) located entirely within a single computer or other computing device; or (ii) connected to each other by a remote communication medium, such as a serial port cable, telephone line or radio frequency transceiver. In one embodiment, the call center device 202 may comprise one or more computers that are connected to a remote server computer for maintaining databases.

A conventional personal computer or workstation with sufficient memory and processing capability may be used as the call center device 202. In one embodiment, the call center device 202 operates as or includes a Web server for an Internet environment. The call center device 202 preferably is capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 450. Equivalent processors are available from Motorola, Inc., AMD, or Sun Microsystems, Inc. The processor 450 also may comprise one or more microprocessors, computers, computer systems, etc.

Software may be resident and operating or operational on the call center device 202. The software may be stored on the data storage device 460 and may include a control program 466 for operating the server, databases, etc. The control program 466 may control the processor 450. The processor 450 preferably performs instructions of the control program 466, and thereby operates in accordance with the present invention, and particularly in accordance with the methods described in detail herein. The control program 466 may be stored in a compressed, uncompiled and/or encrypted format. The control program 466 furthermore includes program elements that may be necessary, such as an operating system, a database management system and device drivers for allowing the processor 450 to interface with peripheral devices, databases, etc. Appropriate program elements are known to those skilled in the art, and need not be described in detail herein.

The call center device 202 also may include or store information regarding parking facilities, garage stations, agents, agent stations, events, revenue control systems, communications, etc. For example, information regarding one or more parking facilities may be stored in a parking facility information database 468 for use by the call center device 202 or another device or entity. Information regarding one or more events may be stored in an event information database 470 for use by the call center device 202 or another device or entity. In some embodiments, some or all of one or more of the databases may be stored or mirrored remotely from the call center device 202.

According to an embodiment of the present invention, the instructions of the control program may be read into a main memory from another computer-readable medium, such as from the ROM 462 to the RAM 464. Execution of sequences of the instructions in the control program causes the processor 450 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 450, communication port 452, clock 454, output device 456, input device 458, data storage device 460, ROM 462, and RAM 464 may communicate or be connected directly or indirectly in a variety of ways. For example, the processor 450, communication port 452, clock 454, output device 456, input device 458, data storage device 460, ROM 462, and RAM 464 may be connected via a bus 474.

While specific implementations and hardware configurations for the call center device 202 has been illustrated, it should be noted that other implementations and hardware configurations are possible and that no specific implementation or hardware configuration is needed. Thus, not all of the components illustrated in FIG. 8 may be needed for a call center device implementing the methods disclosed herein.

Database

As previously discussed above, in some embodiments a server, user device, or other device may include or access an event database for storing or keeping information regarding one or more events occurring at a parking facility. One representative event information database 500 is illustrated in FIG. 9.

The event information database 500 may include an event identifier field 502 that may include codes or other identifiers for one or more events, an event date field 504 and an event time field 506 that may include date and time information for the events identified in the field 502, an event location identifier field 508 that may include codes or other identifiers for the locations of the events identified in the field 502, a garage station identifier field 510 that may include codes or other identifiers for the one or more garage stations associated with the events identified in the field 502, an agent identifier field 512 that may include codes or other identifiers for agents assigned to the events identified in the field 502, a problem identifier field 514 that may include classifying codes or other identifiers indicated by the agents identified in the field 512 regarding problems (e.g., exit gate fails to open, exit gate fails to close, ticket dispenser fails to provide ticket) associated with the events identified in the field 502, and a resolution/solution identifier field 516 that may include classifying codes or other identifiers indicated by the agents identified in the field 512 for resolutions/solutions (e.g., control signal sent to open or close gate, message regarding event sent to representative local to the event location who can address the problem on site).

In some embodiments, other or different fields also may be used in the event information database 500. For example, in some embodiments an event information database may include information regarding the length of time needed to resolve an event, information regarding an agent station associated with an agent assigned to the event, information regarding communications between the agent or agent station and a garage station, information regarding revenue lost as a result of the event, etc.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for facilitating customer service for a parking facility, comprising:
   receiving data indicative of an event at a parking facility;
   determining an agent to associate with said event;
   assigning said event to said agent; and
   providing data indicative of said event to a device associated with said agent.

2. The method of claim 1, wherein said data indicative of an event at a parking facility includes at least one of the following:
   an identifier associated with said parking facility;
   an identifier associated with a garage station at said parking facility; and
   a telephone number associated with a telephone call made from said parking facility.

3. The method of claim 1, wherein said receiving data indicative of an event at a parking facility includes receiving said data from a garage station at said parking facility.

4. The method of claim 1, wherein said receiving data indicative of an event at a parking facility includes receiving said data from a device located at said parking facility.

5. The method of claim 1, further comprising:
   determining an agent station associated with said agent.

6. The method of claim 1, further comprising:
   determining a location of said parking facility.

7. The method of claim 1,
   determining a garage station associated with said event.

8. The method of claim 1, further comprising:
   facilitating communication between said agent station and a garage station located at said parking facility.

9. The method of claim 1, wherein said determining said agent includes determining a location associated with said event.

10. The method of claim 1, wherein said data is received via a telephone call.

11. The method of claim 10, further comprising:
    determining a telephone number associated with said telephone call.

12. The method of claim 1, wherein said receiving data indicative of an event at a parking facility includes receiving data indicative of a telephone number for a telephone located at said parking facility.

13. The method of claim 1, wherein said receiving data indicative of an event at a parking facility includes receiving data indicative of a communication device located at said parking facility.

14. A method for facilitating customer service for a parking facility, comprising:
    receiving data indicative of an event at a parking facility;
    determining said parking facility;
    determining an agent to handle said event;
    assigning said event to said agent; and
    providing data indicative of said event to a device associated with said agent.

15. A system for facilitating customer service for a parking facility, comprising:
    at least one agent station; and
    a call center device in communication with at least one garage station at a parking facility and said at least one agent station, said call center device adapted to receive data indicative of an event at said parking facility, to determine an agent to associate with said event, to assign said event to an agent, and to provide data indicative of said event to an agent station associated with said agent.

16. The system of claim 15, wherein said at least one agent station includes an application adapted to receive a video signal associated with said event.

17. The system of claim 15, where said at least one agent station includes an application adapted to request permission to control a garage station associated with said event.

18. The system of claim 15, where said at least one agent station includes an application adapted to provide data to a garage station associated with said event.

19. The system of claim 15, further comprising:
    a revenue management system in communication with said at least one agent station.

20. A system for facilitating customer service for a parking facility, comprising:
    a memory;
    a communication port; and
    a processor connected to said memory and said communication port, said processor being operative to:
    receive data indicative of an event at a parking facility;
    determine an agent to associate with said event;
    assign said event to said agent; and
    provide data indicative of said event to a device associated with said agent.

21. A computer program product in a computer readable medium for facilitating customer service for a parking facility, comprising:
    instructions for obtaining data indicative of an event at a parking facility;
    instructions for determining an agent to associate with said event
    instructions for associating said event with said agent; and
    instructions for sending data indicative of said event to a device associated with said agent.

* * * * *